(12) United States Patent
Goldenburg et al.

(10) Patent No.: US 6,860,641 B1
(45) Date of Patent: Mar. 1, 2005

(54) FACEPLATE ELECTROSTATIC DISCHARGE ATTENUATING WAVEGUIDE

(75) Inventors: Joseph Goldenburg, Atlanta, GA (US); Terrence M. McGill, Sr., Stevensville, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/770,369

(22) Filed: Jan. 26, 2001

(51) Int. Cl.[7] .............................. G02B 6/36; G02B 6/38
(52) U.S. Cl. ............................ 385/53; 385/70; 385/75; 385/94
(58) Field of Search .............................. 385/53, 70, 77, 385/86, 94, 55, 75

(56) References Cited

U.S. PATENT DOCUMENTS

| | | | | |
|---|---|---|---|---|
| 5,082,344 | A | * | 1/1992 | Mulholland et al. .......... 385/60 |
| 6,241,398 | B1 | * | 6/2001 | Correa et al. .................. 385/75 |
| 6,267,606 | B1 | * | 7/2001 | Poplawski et al. ............ 439/92 |
| 6,358,079 | B1 | * | 3/2002 | Noble ......................... 439/328 |
| 6,459,517 | B1 | * | 10/2002 | Duncan et al. ............. 398/135 |
| 6,474,876 | B1 | * | 11/2002 | Sikorski, Jr. ................. 385/55 |
| 6,713,672 | B1 | * | 3/2004 | Stickney ................ 174/35 GC |
| 2001/0053624 | A1 | * | 12/2001 | Medina et al. .............. 439/404 |
| 2002/0114593 | A1 | * | 8/2002 | Terada et al. ................. 385/93 |

\* cited by examiner

Primary Examiner—Chandrika Prasad

(74) Attorney, Agent, or Firm—Michael R. Cammarata

(57) ABSTRACT

Faceplate, energy-attenuating, waveguide extensions are provided for use with an optical communications module having a circuit board. The circuit board has a plurality of transceivers adjacent to corresponding openings in a front portion of a faceplate, outside a protective zone of a Faraday cage created by the faceplate and adjacent modules, exposing the transceivers to electrostatic discharge (ESD), electromagnetic interference (EMI) or other destructive energy created by the faceplate openings. To attenuate the ESD, EMI, or other energy emanating through the faceplate openings, an integral, waveguiding, snout-like extension (or protrusion) is provided around the periphery of each of the faceplate openings. A removable waveguide extension to the snout-like extension may also be provided to further attenuate ESD, EMI or other energy. The longer the waveguide created by the combined removable extension and the integral snout-like extension, the greater the ESD, EMI, or other energy attenuation. The waveguide extension is removable so that the transceivers on the circuit board are accessible. If a connection is to be established between a male fiber connector and a female connector provided within the transceiver, the removable waveguide extension can be slid over the male connector before the connection is made. After the connection is established, the removable waveguide extension may then be slid down over the snout-like waveguide extension. The removable waveguide extension may also be provided with a conductive gasket to improve the electrical connectivity between the removable waveguide extension and the faceplate and thereby provide a more integral and sound Faraday cage for the circuit board transceivers.

26 Claims, 5 Drawing Sheets

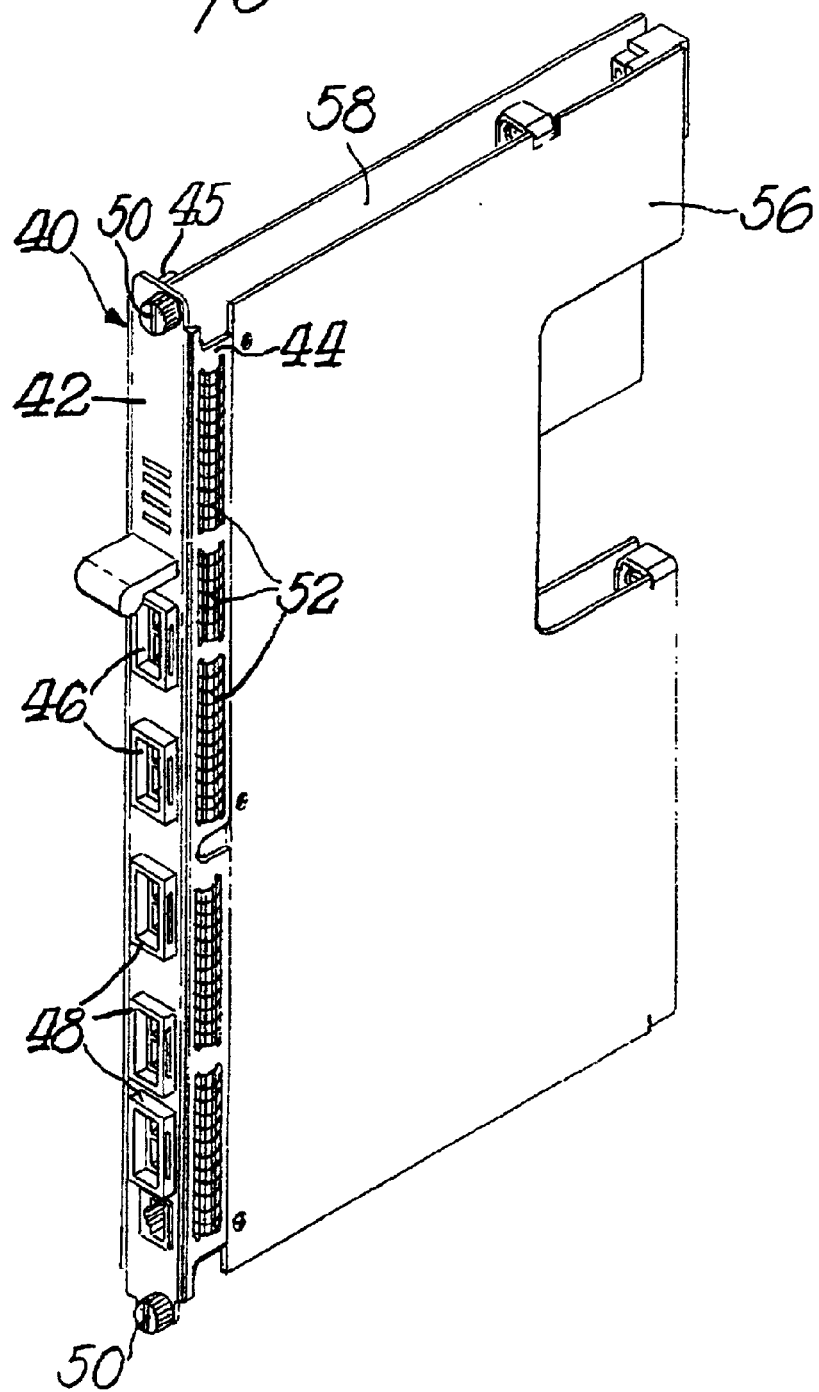

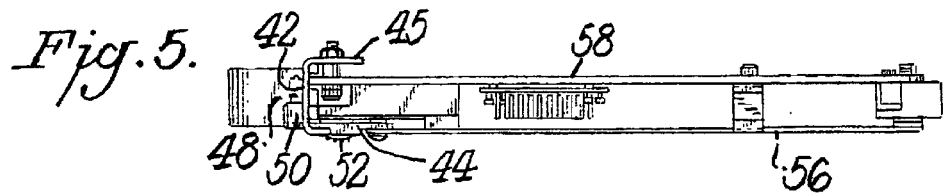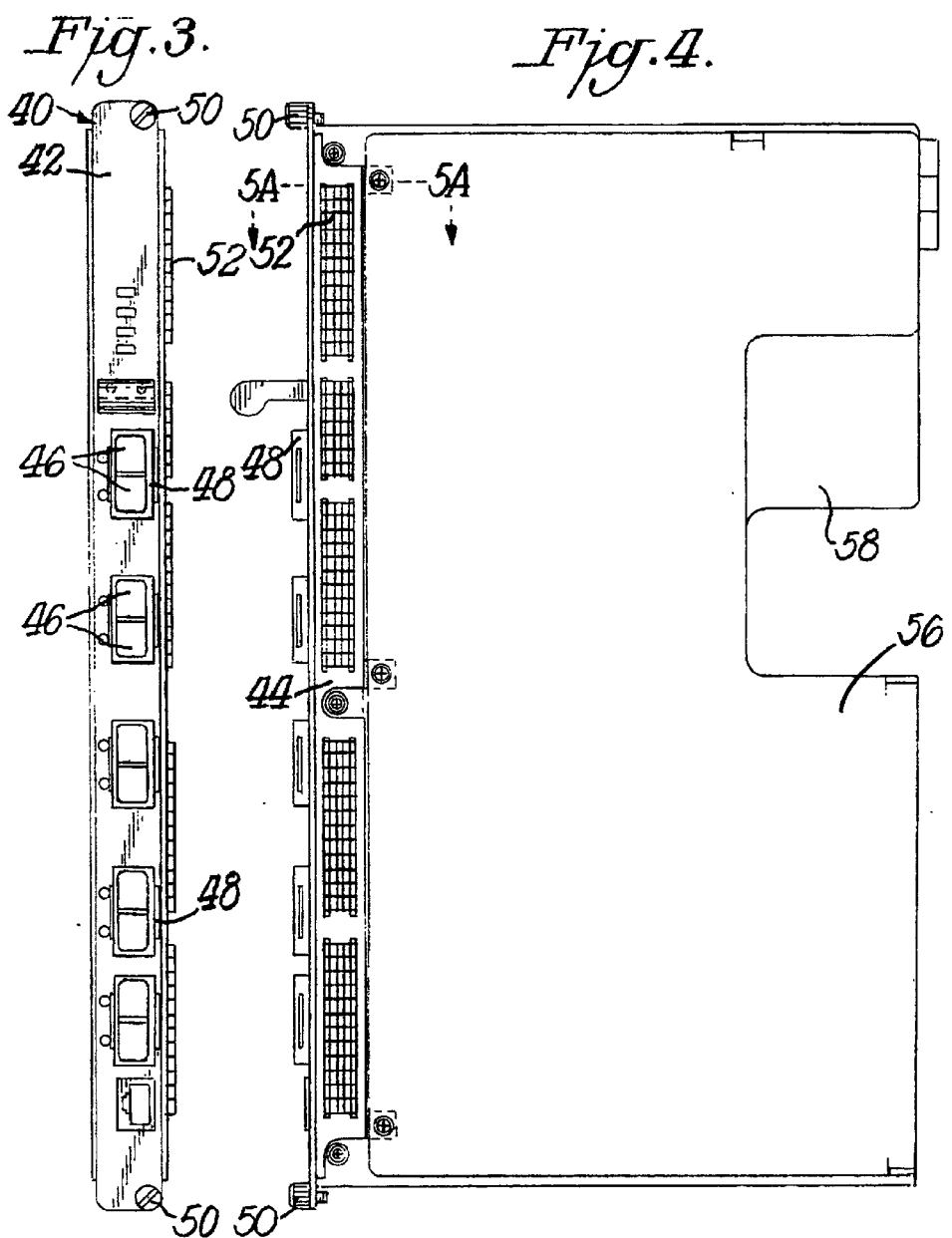

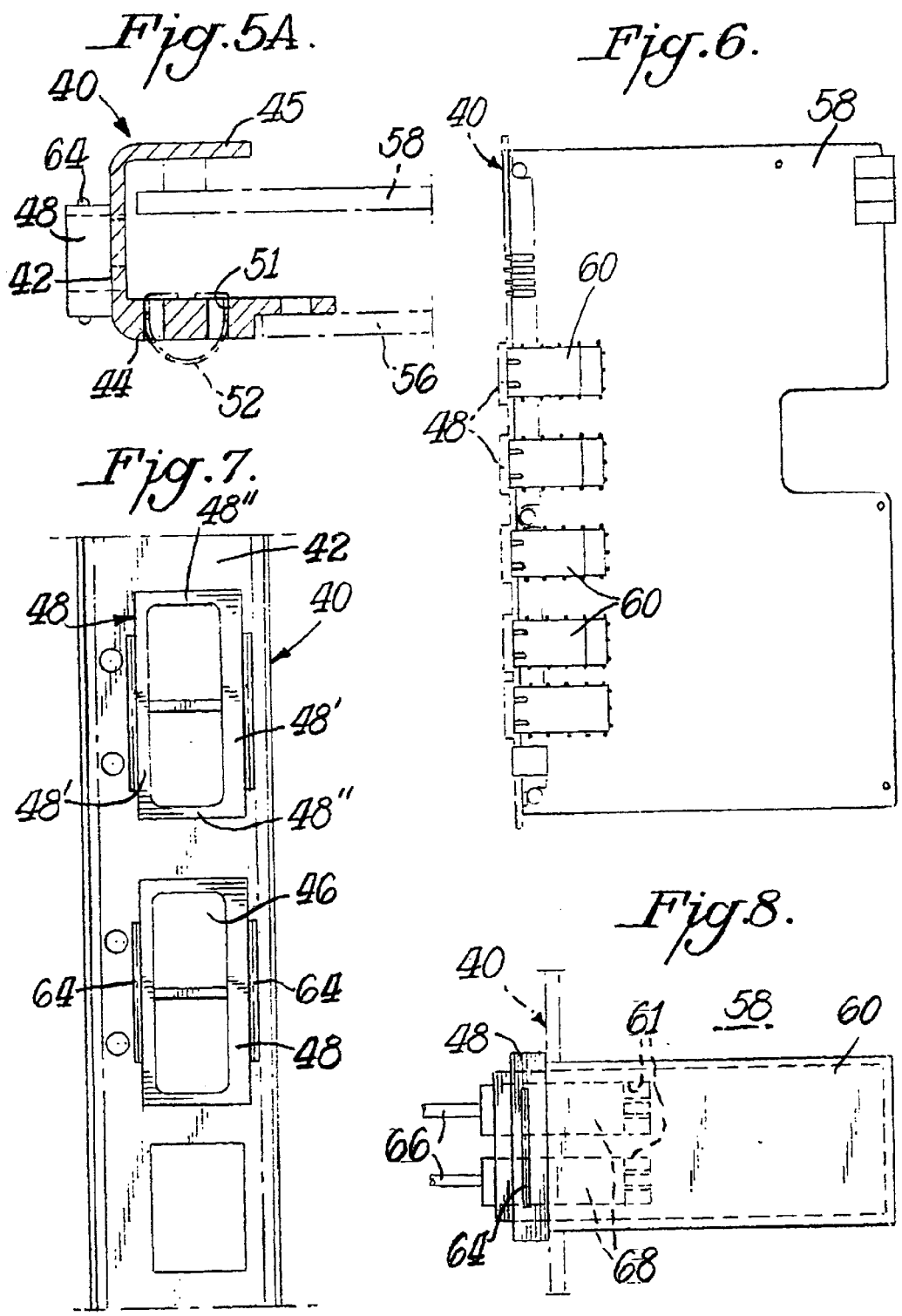

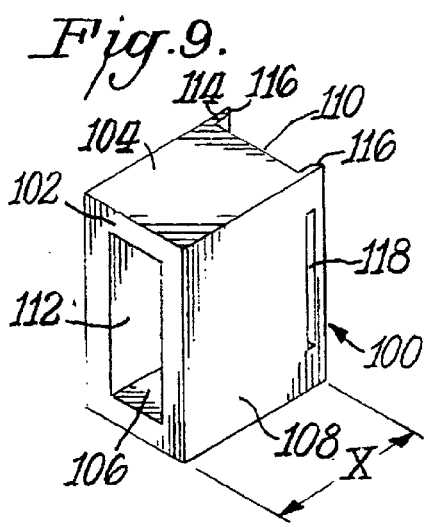
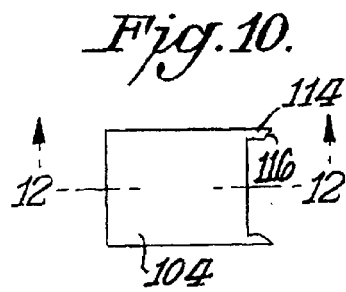
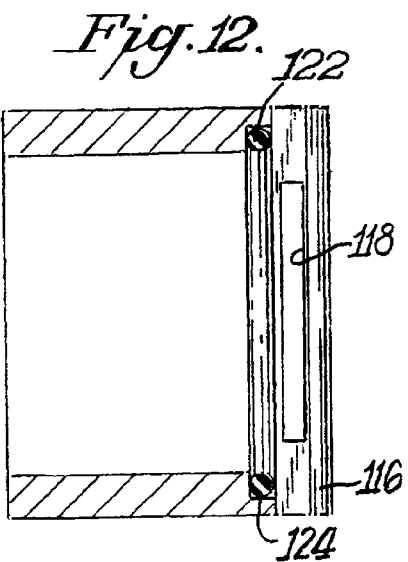
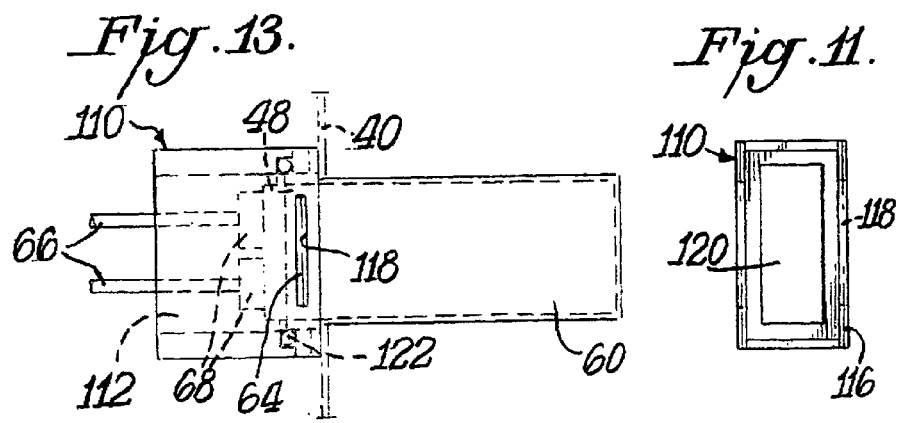

FACEPLATE ELECTROSTATIC DISCHARGE ATTENUATING WAVEGUIDE

BACKGROUND OF THE INVENTION

A. Field of the Invention

The present invention relates generally to the optical communications field, and, more particularly to a faceplate electrostatic discharge attenuating waveguide.

B. Description of the Related Art

Circuit board space (real estate) is at a premium in the optical communications field for a variety of reasons. First, many carriers or other consumers of optical communications equipment have a very limited floor space in which to place new equipment. For example, some carriers may only have a single open bay (or shelf) in which to place new equipment. If the communications equipment can be more densely packed, then a greater amount of equipment may be placed within the available space.

Another reason for the premium on circuit board real estate is the ever increasing number of channels that equipment vendors are attempting to squeeze into the available space. For example, DWDM (dense wave division multiplexing) equipment vendors relentlessly attempt to increase the number of channels that the equipment can handle. Since each channel typically requires a separate circuit board, the number of circuit boards and associated space requirements also increases with increasing channel counts.

In the optical communications field various connections must be made between the equipment and fiber. Conventional connectors are used to make these connections between the fiber and a module. It has been a common practice of many vendors to situate these connections behind an outer faceplate of the module in order to protect the module components from ESD (electrostatic discharge). The strength and frequency of the ESD passing through the openings in the faceplate is a function of three variables: the size of the opening, depth of the opening, and the strength of the source ESD generator. Indeed, there are a variety of industry standards that specify ESD tolerances. To meet these standards, a simple solution is to place the module components far behind the outer faceplate. As is also known in the art, the outer faceplate is part of a Faraday cage or conductive case shield that protects the components within from ESD.

FIGS. 1A and 1B show a conventional faceplate 10 and circuit board 30 arrangement. As shown, faceplate 10 has a front portion 12 integrally connected to a pair of side portions 14, 18. A plurality of openings 16 are provided in front portion 12, each opening 16 being sized to permit a bulkhead adapter 34 to be provided therein. Front portion 12 also includes a pair of retractable fasteners 20 for connecting faceplate 10 to a shelf (not shown) that houses faceplate 10 and circuit board 30. Side portion 14 has eight slots 22 (four pairs of two slots 22) provided therethrough for mounting spring fingers (not shown) thereon. The spring fingers provide grounding contact with adjacent modules, and along with faceplate 10 and the shelf, create a Faraday cage that protects the components within from ESD.

Side portion 14 further has a plurality of holes 24 for connecting faceplate 10 to a cover plate 28, via conventional fastening means, such as screws. Faceplate 10, circuit board 30, and cover plate 28 make up a module that may be slid into and out of an optical communications equipment shelf.

The grounding contact between the spring fingers of adjacent modules, as well as the shelf, creates the Faraday cage that protects the components of circuit board 30 housed within the optical communications equipment shelf.

As best seen in FIG. 1B, circuit board 30 includes a plurality of transceivers 32 that mount onto circuit board 30. A transceiver is a combination transmitter/receiver in a single package. The term is used in reference to transmitter/receiver devices in cable or optical fiber systems. Each transceiver 32 includes a plurality of male or female connectors provided therein that align with a corresponding opening 16 provided in front portion 12 of faceplate 14 and receive corresponding male or female connectors and fibers. A bulkhead adapter 34, which is typically a female/female connector, is provided within each opening 16 of faceplate 10. A pair of fibers 36 with male connectors 38 connect to the female connectors provided in the portion of each bulkhead adapter 34 located outside of faceplate 10 (facing away from circuit board 30). Another pair of fibers 36' with male connectors 38' connect to female connectors provided in the portion of each bulkhead adapter 34 located inside of faceplate (facing towards circuit board 30). The opposite ends of fibers 36' have male connectors 38' that connect to female connectors provided within a corresponding transceiver 32. Transceivers 32 are provided in an interior portion of circuit board 30, away from the edges 30' of circuit board 30. This way transceivers 32 lie within the zone of protection provided by the Faraday cage, described above, protecting transceivers 32 from ESD. The Faraday cage effectively attenuates almost all of the ESD emanating through openings 16 of faceplate 10 a distance of approximately 2¼ inches away from faceplate 10. Thus, the preferred spacing of transceivers 32 from the edges 30' of circuit board 30 is 2¼ inches.

Although situating transceivers 32 far behind faceplate 10 typically solves the ESD problem, the practice creates another, separate problem. Namely, the space in front of transceivers 32 wastes valuable circuit board real estate. As mentioned above, this real estate is quite valuable particularly as circuit density and channel counts increase.

SUMMARY OF THE INVENTION

The inventors of this application recognized the problems of the related art and found various solutions to address both the ESD problem and conserve circuit board real estate.

To that end, the inventors moved at least some of the transceivers to the outer faceplate itself. Instead of consuming valuable circuit board real estate, the transceivers were moved outside the zone of protection offered by the Faraday cage. The faceplate location, however, exposes the transceivers to ESD.

To solve the ESD problem created by moving the transceivers outside the zone of protection of the Faraday cage, the inventors first created an integral, waveguiding, snout-like extension (or protrusion) from the faceplate that attenuates ESD.

To further solve the ESD problem created by moving the transceivers outside the Faraday cage, the inventors also created a removable waveguide extension to the snout-like extension. The longer the waveguide created by the combined removable extension and the integral snout-like extension, the greater the ESD attenuation.

Extending the snout-like extension with an integral structure, however, would make the transceivers provided on the circuit board inaccessible. Therefore, the waveguide extension is preferably removable so that the transceivers on the circuit board are accessible. If a connection is to be established between, for example, a male connector and fiber and a female connector provided within a transceiver, the removable waveguide extension can be slid over the male connector before the connection is made. After the connection is established, the removable waveguide extension may then be slid down over the snout-like waveguide extension.

Even more preferable, the removable waveguide extension is provided with a conductive gasket to improve the electrical connectivity between the removable waveguide extension and the faceplate and thereby provide a more integral and sound Faraday cage.

In accordance with the purpose of the invention, as embodied and broadly described herein, the invention comprises an apparatus for attenuating electrostatic discharge or electromagnetic interference, including: a conductive faceplate for an optical module, said faceplate having at least one faceplate opening provided therein; and a faceplate extension projecting from said conductive faceplate, around the periphery of the faceplate opening, and forming an electrostatic or electromagnetic waveguide.

Further in accordance with the purpose of the invention, the invention comprises an apparatus for attenuating electrostatic discharge or electromagnetic interference, including: a conductive faceplate for an optical module, said faceplate having a plurality of faceplate openings provided therein; and a plurality of faceplate extensions, each faceplate extension projecting from said conductive faceplate, around the periphery of a corresponding one of the plurality of faceplate openings, and forming an electrostatic or electromagnetic waveguide.

Even further in the accordance with purpose, the present invention comprises an optical multiplexor housing, including: a conductive faceplate for an optical multiplexor, said faceplate having a plurality of faceplate openings provided therein; a plurality of faceplate extensions, each faceplate extension outwardly projecting from said conductive faceplate, around the periphery of a corresponding one of the plurality of faceplate openings, and forming an electrostatic or electromagnetic waveguide; and a plurality of transceivers for the optical multiplexor, each transceiver being provided adjacent to each of the plurality of faceplate openings, each transceiver being protected from electrostatic discharge or electromagnetic interference by a corresponding faceplate extension provided around the periphery of each faceplate opening.

Still even further in accordance with the purpose, the present invention comprises a method of attenuating an electrostatic discharge or electromagnetic interference in an optical communications module having a faceplate, including: providing a plurality of connector openings in the faceplate; and extending portions of the faceplate substantially surrounding the peripheries of each of the connector openings to form a plurality of electrostatic or electromagnetic waveguides.

Further in accordance with the purpose, the present invention comprises an apparatus for attenuating energy, including: a conductive faceplate for an optical module, said faceplate having at least one faceplate opening provided therein; and a faceplate extension projecting from said conductive faceplate, around the periphery of the faceplate opening, and forming an energy waveguide.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a perspective view of a faceplate and circuit board arrangement in accordance with a preferred embodiment of the present invention;

FIG. 3 is a front view of the faceplate and circuit board arrangement shown in FIG. 2;

FIG. 4 is a side view of the faceplate and circuit board arrangement shown in FIG. 2;

FIG. 5 is a top view of the faceplate and circuit board arrangement shown in FIG. 2;

FIG. 5A is a cross-sectional view of the faceplate and circuit board arrangement of the present invention, taken along line 5A—5A of FIG. 4;

FIG. 6 is a side view of the faceplate and circuit board arrangement shown in FIG. 2, with the faceplate shown in phantom and the cover plate removed for clarity;

FIG. 7 is a fragmental end elevational view of a portion of the front view of the faceplate shown in FIG. 3;

FIG. 8 is partial side view of the faceplate and circuit board arrangement shown in FIG. 2, showing the interconnection of a fiber connector with a transceiver on the circuit board;

FIG. 9 is a perspective view of a removable waveguide extension in accordance with another embodiment of the present invention;

FIG. 10 is a top view of the removable waveguide extension shown in FIG. 9;

FIG. 11 is a rear view of the removable waveguide extension shown in FIG. 9;

FIG. 12 is a cross-sectional view of the removable waveguide extension of the present invention, taken along line 12—12 of FIG. 10; and FIG. 13 is a side view of the removable waveguide extension shown in FIG. 9, showing how it interconnects with the snout-like waveguide extension of the faceplate shown in FIG. 2, and further showing the interconnection of a connector and fiber with a transceiver on the circuit board of FIG. 2.

DETAILED DESCRIPTION OF THE PREFERRED EMBODIMENTS

Figure 1A:
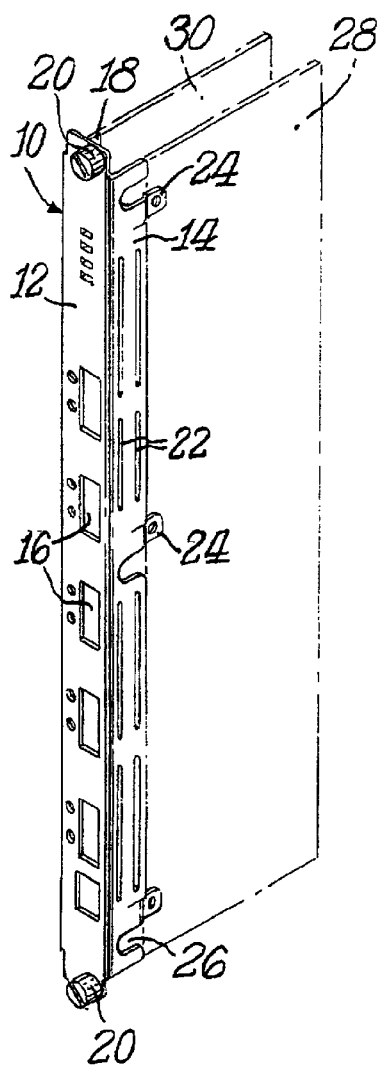
FIG. 1A is a perspective view of a conventional faceplate and circuit board arrangement.
Figure 1B:
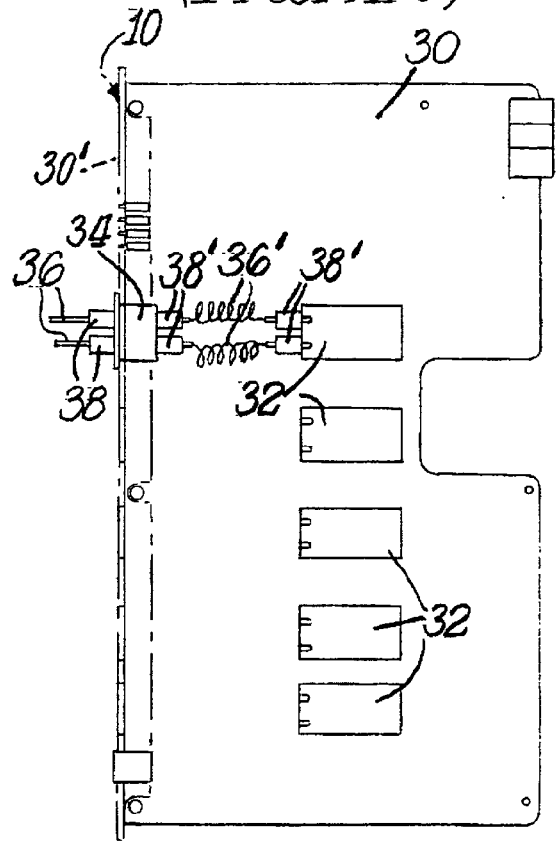
FIG. 1B is a side view of the conventional faceplate and circuit board arrangement shown in FIG. 1A, with the faceplate shown in phantom and the cover plate removed for clarity.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection. As further used herein, the term "waveguide" refers to an electromagnetic feed line that attenuates ESD, electromagnetic interference (EMI), or other energy. An electromagnetic field radiates lengthwise along a waveguide, permitting ESD, EMI, or other energy attenuation. The term "electrostatic discharge" or "ESD", as used herein, refers to the rapid, spontaneous transfer of electrostatic charge induced by a high electrostatic field. Usually the charge flows through a spark (static discharge) between two bodies at different electrostatic potentials as they approach one another.

FIG. 2 shows a perspective view of a faceplate 40 and a circuit board 58 arrangement of the present invention. FIGS. 3–5 show the front, side and top views, respectively, of the arrangement shown in FIG. 2. Faceplate 40 has a front portion 42 integrally connected to a pair of side portions 44, 45. A plurality of openings 46 are provided in front portion 42 of faceplate 40. A snout-like, waveguide extension (or protrusion) 48, described more fully below with reference to FIG. 7, is integral with and extends away from front portion 42 of faceplate 40 (away from circuit board 58) and attenuates ESD, EMI, or other destructive energy. Front portion 42 also includes a pair of retractable fasteners 50 for connecting faceplate 40 to a shelf (not shown) that houses faceplate 50 and circuit board 58.

Side portion 44 has five groups of spring fingers 52 provided thereon. Spring fingers 52 provide grounding contact with an adjacent module (not shown) to help create a Faraday cage, which protects the components within from ESD. FIG. 5A shows how spring fingers 52 are connected to a pair of slots 51 provided through side portion 44. Side portion 44 connects to a cover plate 56 via conventional fastening means, such as screws, nuts and bolts, etc.

FIG. 6 is a side view of faceplate 40 and circuit board 58 arrangement shown in FIG. 2, with faceplate 40 shown in phantom and cover plate 56 removed for clarity. Circuit board 58 includes a plurality of transceivers 60, wherein each transceiver 60 aligns with a corresponding opening 46 provided in front portion 42 of faceplate 40 and receives a corresponding male or female connector and fiber provided through opening 46.

As can be seen from FIG. 6, transceivers 60 overhang the edge of circuit board 58, freeing up valuable real estate in the interior of circuit board 58. Thus transceivers 60 do not lie behind the zone of protection provided by the Faraday cage created by faceplate 40, the shelf, and the five to groups of spring fingers 52 provided on side portion 44 of faceplate 40, but instead lie adjacent to the openings 46 of faceplate front portion 42, exposing transceivers 60 to ESD, EMI, or other destructive energy. However, in the present invention, the ESD, EMI, or other destructive energy are dissipated by providing snout-like waveguide extensions 48 at each opening 46 of faceplate 40, protecting transceivers 60 from ESD, EMI, or other destructive energy.

FIG. 7 is a fragmented end elevational view of a portion of front portion 42 of faceplate 40, showing in detail two snout-like waveguide extensions 48 of the present invention. Snout-like waveguide extension 48 surrounds the periphery of faceplate opening 46 and is shown with a rectangular cross-section, although extension 48 may be made of a circular or square cross section, depending upon the shape of faceplate opening 46 and the connectors to be used with opening 46. Rectangular snout-like waveguide extension 48 is made from a pair of longer walls 48' integrally connected to a pair of shorter walls 48". Longer walls 48' may be switched with shorter walls 48", and vice versa, depending upon the shape of faceplate opening 46.

Each longer wall 48' may have a lip, rib, or protrusion 64 extending therefrom, although protrusion 64 may be provided on each shorter wall 48". Snout-like waveguide extension 48 and faceplate 40 are preferably made from the same material, but could be made from different materials. Materials that could be used for snout-like waveguide extension 48 and faceplate 40 may be made of a variety of conductive materials, including for example, aluminum alloy, aluminum, stainless steel, or plastic. A preferred material for the snout-like waveguide extension 48 and faceplate 40 is aluminum alloy 6001.

Although dimensions may vary for snout-like waveguide extension 48 depending upon the connectors being used, the walls of extension 48 should be high enough to dissipate ESD, EMI or other energy emanating through opening 46, but also short enough to permit a connector and fiber provided through opening 46 to connect with and disconnect from transceiver 60 provided on circuit board 58. The greater the height of extension walls 48', 48", the greater the ESD, EMI or other energy attenuation. However, the greater the height of extension walls 48', 48", the more difficult it becomes to disconnect a connector and fiber from circuit board transceiver 60 since the connector and fiber will eventually become recessed within extension 48, when connected.

By way of example and not limitation, when extension 48 is used with conventional fiber optic connectors, a preferred height of the walls 48', 48" of snout-like waveguide extension 48 is at least 0.2 inches, and more preferably 0.27 inches. The ESD attenuation provided by an extension 48 having a height of 0.27 inches is greater than seven (7) decibels (dB).

FIG. 8 shows how a pair of fibers and connectors interconnect with connectors 61 provided within a transceiver 60. In this case, transceiver connectors 61 are female connectors and fibers 66 are each connected to a male connector 68, although male connectors could be provided within transceiver 60 and fibers 66 could be connected to female connectors. Fibers 66 and male connectors 68 may be connected to transceiver connectors 61 by providing fibers 66 and male connectors 68 within snout-like waveguide extension 48, through opening 46 in faceplate 40, and mating the same with corresponding transceiver connectors 61. Such a connection provides an optical communication between fibers 66 and transceivers 60, via connectors 61, 68. Connectors 68 may be disconnected from transceiver connectors 61 by pulling them away from transceiver connectors 61.

Since the height of walls 48', 48" of snout-like waveguide extension 48 cannot be so high to prevent disconnection of connectors 68 from transceiver connectors 61, further ESD attenuation cannot be achieved by snout-like waveguide extension 48. Snout-like waveguide extension 48 meets the rigorous Network Equipment Building System (NEBS) requirements originally developed by Bell Telephone Laboratories in the 1970s and expanded by Bellcore. Long a requirement for equipment used in the Central Office in the North American Public Switched Network, the NEBS criteria have become a universal measure of network product excellence.

All electronic equipment has the potential to interfere with other electronic equipment. Interference can be caused by electromagnetic radiation, the grounding system, the electrical power connection, excessive heat or blocking the natural air flow, and connecting wires or cables. The Federal Communications Commission (FCC) regulates a portion of this problem through Part 15 of their rules and regulations, which specifies a maximum allowable amount of electromagnetic radiation from an electronic device in a commercial or residential environment at specific frequencies.

Another standard that addresses the issue of collocated electronic equipment is NEBS. Even more stringent than the FCC Part 15 requirements, NEBS covers a large range of requirements including criteria for personnel safety, protection of property, and operational continuity. NEBS covers both physical requirements including: space planning, temperature, humidity, fire, earthquake, vibration, transportation, acoustical, air quality and illumination; and electrical criteria including: electrostatic discharge (ESD), electromagnetic interference (EMI), lightning and AC power fault, steady state power induction, corrosion, DC potential difference, electrical safety and bonding and grounding.

Although extension 48 provides sufficient ESD and EMI attenuation to satisfy NEBS criteria, some consumers may desire greater ESD and EMI attenuation. To satisfy this desire, a removable waveguide extension 100 to snout-like waveguide extension 48 may be provided. The longer the waveguide created by the combined removable extension 100 and integral snout-like waveguide extension 48, the greater the ESD and EMI attenuation. Extending snout-like waveguide extension 48 with an integral structure, however, would make transceiver connectors 61 inaccessible. Therefore, waveguide extension 100 is preferably removable so that transceivers 60 are accessible.

Removable waveguide extension 100, as shown in FIGS. 9–12, is generally rectangular in shape, although extension 100 may be another shape such as tubular or square, depending upon the shape of faceplate opening 46 and transceiver connectors 61 configuration. Removable waveguide extension 100 has a front portion 102, a top portion 104, a bottom portion 106, a pair of side portions 108, and a back portion 110, with all portions being integrally connected together. Front portion 102 has an opening 112 provided therein, wherein opening 112 is preferably of the same size and shape as faceplate opening 46. Each side portion 108 has a slit 118 provided therethrough for engaging lip or protrusion 64 of snout-like waveguide extender 48, as will be described. Back portion 110 has a pair of flanges 114 extending therefrom, each flange 114 having a chamfer 116 at its distal end, as best seen in FIG. 10. Back portion 110 further has an opening 120 provided therein that is preferably the same size and shape as faceplate opening 46, as shown in FIG. 11.

Although removable waveguide extension 100 may be made from any conductive material, preferably removable waveguide extension 100 comprises heavily nickel-doped plastic. Furthermore, removable waveguide extension 100 may have side portions 108 of varying dimensions, but it has been found that side portions 108 having a height of at least one inch, and more preferably 1.1 inches, will satisfy the ESD and EMI attenuation requirements of all consumers. The height of each side portion 108 is determined by measuring the distance X (as shown in FIG. 9) spanned by side portion 108 between front portion 102 and back portion 110 of removable waveguide extension 100. The ESD attenuation provided by removable waveguide extension 100 having side portions 108 with a height of 1.1 inches is greater than twenty-eight (28) decibels (dB).

Even more preferable, the removable waveguide extension 110 is provided with a conductive gasket 122, as shown in FIG. 12, to improve the electrical connectivity between removable waveguide extension 100 and faceplate 40, via snout-like waveguide extension 48, and thereby provide a more sound Faraday cage for attenuating ESD, EMI or other destructive energy. Conductive gasket 122 is received in a recessed groove 124 provided in removable waveguide extension 100. Conductive gasket may be made from any conductive material, such as for example, a conductive polymer material or a metal-plated composite material.

If a connection is to be established between, for example, fibers 66 and male connectors 68 and female transceiver connectors 61, removable waveguide extension 100 is slid over male connectors 66 (through openings 112, 120) before the connection is made. After the connection is established, removable waveguide extension 100 may then be slid down over snout-like waveguide extension 48. The chamfers 116 provided on flanges 114 of removable waveguide extension 100 permit easier sliding connection of removable waveguide extension 100 onto snout-like waveguide extension 48. FIG. 13 shows the resulting interconnection which is the same as described above for FIG. 8. Removable waveguide extension 100 is connected to snout-like waveguide extension 48 when protrusions 64 of extension 48 snap into and engage slits 118 provided in removable waveguide extension 100.

If connectors 61, 68 are to be disconnected, extension 100 is first disengaged by pulling it away from faceplate 40, forcing protrusions 64 away from slits 118. Removable waveguide extension 100 is slid over fibers 66 to expose snout-like waveguide extension 48 and a portion of connectors 68. Connectors 68 may then be disconnected from transceiver connectors 61 by pulling them away from connectors 61.

It will be apparent to those skilled in the art that various modifications and variations can be made in the faceplate electrostatic discharge attenuating waveguide extensions of the present invention and in construction of these extensions without departing from the scope or spirit of the invention.

As an example, the waveguide extensions of the present invention can be used in any field that provides connections to circuit boards protected by a faceplate, such as for example, in the telecommunications field. Furthermore, although the drawings show circuit board 58 as being an optical multiplexor, the waveguide extensions of the present invention may used with any circuit board that is protected by a faceplate from ESD, EMI, or other destructive energy. Finally, although not shown in the drawings, snout-like waveguide extension 48 may extend inwardly from front portion 42 of faceplate 40, toward circuit board 58.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for attenuating electrostatic discharge or electromagnetic interference, comprising:
    a conductive faceplate for an optical module, said faceplate having an outer face and at least one faceplate opening provided therein;
    a faceplate extension, having an unthreaded interior surface extending outwardly from said conductive faceplate, the faceplate extension projecting outwardly and originating from the outer face, adjacently around the periphery of the faceplate opening, and forming an electrostatic or electromagnetic waveguide.

2. An apparatus for attenuating electrostatic discharge or electromagnetic interference as recited in claim 1, wherein said faceplate extension is rectangular-shaped and has an opening provided therethrough that communicates with the faceplate opening.

3. An apparatus for attenuating electrostatic discharge or electromagnetic interference as recited in claim 1, wherein a transceiver for a circuit board is provided adjacent to the faceplate opening and is protected from electrostatic discharge by said faceplate extension.

4. An apparatus for attenuating electrostatic discharge or electromagnetic interference as recited in claim 3, wherein a connector for a fiber is provided through said faceplate extension and the faceplate opening to optically communicate with a connector provided within the transceiver.

5. An apparatus for attenuating electrostatic discharge or electromagnetic interference as recited in claim 1, wherein said conductive faceplate and said faceplate extension comprise aluminum alloy.

6. An apparatus for attenuating electrostatic discharge or electromagnetic interference as recited in claim 1, wherein said faceplate extension outwardly projects from said conductive faceplate at least 0.2 inches.

7. An apparatus for attenuating electrostatic discharge or electromagnetic interference as recited in claim 1, wherein said faceplate extension is circular-shaped and has an opening provided therethrough that communicates with the faceplate opening.

8. An apparatus for attenuating electrostatic discharge or electromagnetic interference, comprising:
    a conductive faceplate for an optical module, said faceplate having an outer face and a plurality of faceplate openings provided therein; and
    a plurality of faceplate extensions, each faceplate extensions having an unthreaded interior surface extending outwardly from said conductive faceplate, each faceplate extension projecting outwardly and originating from the outer face, adjacently around the periphery of a corresponding one of the plurality of faceplate openings, and forming an electrostatic or electromagnetic waveguide.

9. An apparatus for attenuating electrostatic discharge or electromagnetic interference as recited in claim 8, wherein said plurality of faceplate extensions project outwardly from said conductive faceplate.

10. An apparatus for attenuating electrostatic discharge or electromagnetic interference as recited in claim 8, wherein each faceplate extension is rectangular-shaped and has an opening provided therethrough that communicates with a corresponding faceplate opening.

11. An apparatus for attenuating electrostatic discharge or electromagnetic interference as recited in claim 8, wherein a transceiver for a circuit board is provided adjacent to each of the faceplate openings of said conductive faceplate, each transceiver being projected from electrostatic discharge or electromagnetic interference by a corresponding faceplate extension provided around the periphery of each faceplate opening.

12. An apparatus for attenuating electrostatic discharge or electromagnetic interference as recited in claim 11, wherein a connector for a fiber is provided through each of said faceplate extensions and the faceplate openings to optically communicate with a corresponding transceiver.

13. An apparatus for attenuating electrostatic discharge or electromagnetic interference as recited in claim 8, wherein said conductive faceplate and each faceplate extension comprises aluminum alloy.

14. An apparatus for attenuating electrostatic discharge or electromagnetic interference as recited in claim 8, wherein each faceplate extension outwardly projects from said conductive faceplate at least 0.2 inches.

15. An apparatus for attenuating electrostatic discharge or electromagnetic interference as recited in claim 8, wherein each faceplate extension is circular-shaped and has an opening provided therethrough that communicates with a corresponding faceplate opening.

16. An optical multiplexor housing, comprising:
    a conductive faceplate for an optical multiplexor, said faceplate having an outer face and a plurality of faceplate openings provided therein;
    a plurality of faceplate extensions, each faceplate extension having an unthreaded interior surface extending outwardly from said conductive faceplate, each faceplate extension projecting outwardly and originating from the outer face, adjacently around the periphery of a corresponding one of the plurality of faceplate openings, and forming an electrostatic or electromagnetic waveguide; and
    a plurality of transceivers for the optical multiplexor, each transceiver being provided adjacent to each of the plurality of faceplate openings, each transceiver being protected from electrostatic discharge or electromagnetic interference by a corresponding faceplate extension provided around the periphery of each faceplate opening.

17. An optical multiplexor housing as recited in claim 16, wherein a connector for a fiber is provided through each of the faceplate extensions and the faceplate openings to optically communicate with a corresponding optical multiplexor transceiver.

18. A method of attenuating an electrostatic discharge or electromagnetic interference in an optical communications module having a faceplate including an outer face, comprising:
    providing a connector opening in the faceplate; and
    extending a portion of the faceplate, said portion having an unthreaded interior surface extending outwardly from the faceplate, and said portion projecting outwardly and originating from the outer face, adjacently around the periphery of the connector opening to form an electrostatic or electromagnetic waveguide.

19. A method of attenuating an electrostatic discharge or electromagnetic interference in an optical communications module having a faceplate including an outer face, comprising:
    providing a plurality of connector openings in the faceplate; and
    extending portions of the faceplate, each said portion having an unthreaded interior surface extending outwardly from the faceplate, and each said portion projecting outwardly and originating from the outer face, adjacently around the peripheries of each of the connector openings to form a plurality of electrostatic or electromagnetic waveguides.

20. An apparatus for attenuating energy, comprising:

a conductive faceplate for an optical module, said faceplate having an outer face and at least one faceplate opening provided therein; and a faceplate extension, having an unthreaded interior surface extending outwardly from said conductive faceplate, the faceplate extension projecting outwardly and originating from the outer face, adjacently around the periphery of the faceplate opening, and forming an energy waveguide.

21. An apparatus for attenuating electrostatic discharge or electromagnetic interference, comprising:

a conductive faceplate for an optical module, said faceplate having an outer face and at least one faceplate opening provided therein;

a faceplate extension, having an unthreaded interior surface extending outwardly, the faceplate extension projecting outwardly and originating from the outer face, adjacently around the periphery of the faceplate opening;

a removable waveguide extension being removably connected to the faceplate extension and forming an electrostatic or electromagnetic waveguide, said removable waveguide extension including an opening provided therethrough for communicating with the faceplate opening.

22. The apparatus of claim 21, wherein said removable waveguide extension having side portions, each said side portion including a slit for receiving a corresponding protrusion provided on the faceplate extension.

23. A method of attenuating an electrostatic discharge or electromagnetic interference, comprising:

providing a connector opening in a faceplate, having an outer face, for an optical module;

extending a portion of the faceplate, said portion having an unthreaded interior surface extending outwardly from the faceplate, the portion projecting outwardly and originating from the outer face, adjacently around the periphery of the connector opening to form an electrostatic or electromagnetic energy waveguide; and connecting a removable waveguide extension to the electrostatic or electromagnetic waveguide.

24. The method of claim 23, wherein said connecting includes providing at least one side portion of the waveguide extension with a slit for receiving a corresponding protrusion provided on the extending portion of the faceplate.

25. The apparatus of claim 1, wherein said faceplate extension being integral to an outer face of said faceplate.

26. The apparatus of claim 1, wherein said faceplate extension projecting beyond end of a transceiver located adjacent to said faceplate opening.

* * * * *